United States Patent [19]

Pecue, II

[11] Patent Number: 5,244,040
[45] Date of Patent: Sep. 14, 1993

[54] METHOD AND APPARATUS TO DETERMINE WELLHEAD LEVEL

[75] Inventor: William W. Pecue, II, Baton Rouge, La.

[73] Assignee: Texaco Inc., White Plains, N.Y.

[21] Appl. No.: 853,195

[22] Filed: Mar. 18, 1992

[51] Int. Cl.⁵ .............................................. E21B 47/02
[52] U.S. Cl. .................... 166/250; 166/368; 33/304
[58] Field of Search ................. 33/227, 336, 348, 368, 33/371, 378, 379, 304, 308; 166/336, 341, 250

[56] References Cited

U.S. PATENT DOCUMENTS

| | | | |
|---|---|---|---|
| 1,891,401 | 12/1932 | Bowlus | 33/304 |
| 2,046,956 | 7/1936 | Lynch et al. | 175/45 |
| 2,184,931 | 12/1939 | Straatman et al. | 175/45 |
| 2,301,307 | 11/1942 | McMahan | 33/304 X |
| 2,514,492 | 7/1950 | Hayward | 33/348 |
| 3,869,806 | 3/1975 | Humphrey | 33/379 X |
| 4,164,817 | 8/1979 | Walker | 33/371 |
| 4,385,449 | 5/1983 | Miller | 33/304 |
| 4,852,265 | 8/1989 | Rando et al. | 33/327 |

Primary Examiner—Ramon S. Britts
Assistant Examiner—Frank S. Tsay
Attorney, Agent, or Firm—James L. Bailey; Kenneth R. Priem; Russell J. Egan

[57] ABSTRACT

The angular misalignment of a wellhead is determined by lowering onto the wellhead an assembly having centering means depending from a base plate and level indicator means fixed on top of the plate. The assembly is suspended from the end of a drillstring which carries a level monitoring means.

13 Claims, 3 Drawing Sheets

METHOD AND APPARATUS TO DETERMINE WELLHEAD LEVEL

BACKGROUND OF THE INVENTION

1. The Field of the Invention

The present invention concerns a method and apparatus for determining the pitch of a wellhead and in particular to an underwater wellhead.

2. Prior Art

In cases where wells are drilled underwater and hydrocarbons deposits are discovered, it may be desirable to temporarily abandon the well such that it can later be "tied back" to a producing structure (platform). This allows the exploratory well to be used as an actual producing well; thereby, eliminating the costly redrilling of another well from the producing structure.

When planning and designing for these tieback operations, it is extremely critical to know the misalignment offsets that exists. One of these offsets is the angular misalignment of the wellhead as it exists underwater, near the mudline. This angular misalignment is the inclination of the wellhead as compared to true vertical reference. Not only is the angle of the wellhead (to within a quarter-degree) critical, but equally important is the heading or direction of the deflection. equally important is the heading or direction of the deflection. Often the water depth deters using divers to perform this reading, so it is desirable to obtain this reading using tools which are run from a vessel or structure above the waterline.

Previously there were two means which could be used to give an estimate of this angular misalignment.

a). One method involved measuring the angle found on the 0-5 degree bubble level indicator attached to the guidance and alignment structure (which had been attached to the jetting string). It had to be assumed that this reading would be equivalent to the inclination of the wellhead which was run on the subsequent casing string.

The shortfall of this system is that there is no guarantee that the inclination of an outer string of pipe would be the same as the inclination of an inner string which did not use centralization. Field results have shown that this assumption can misrepresent the wellhead angular offsets by as much as 150%. Another drawback is that the bubble indicator run on the guidance and alignment structure measures from 0 to 5 degrees with increment lines marked only in one degree intervals. This makes taking the reading to within a quarter-degree substantially impossible.

b). The other method involved running a gyroscope multishot survey tool through a flexible drillstring which would land on top of the wellhead. The surveying tool would land in a slotted profile that would allow an inclination measurement of the wellhead to be taken. If properly taken, this angular offset reading would be within the desired precision tolerances and would also give the heading of the offset.

The shortfall of this system is that the effects of wave and current forces acting on the bottom of this flexible drillstring cause fluctuations which prevent the drillstring from having continuous contact with the top of the wellhead. As a result, numerous survey points were needed and an approximate reading had to be determined using statistical analysis.

SUMMARY OF THE INVENTION

The present invention is an insert type tool that can be run on drillpipe or carried by a diver in shallow water applications and will set on the top profile of the wellhead. A direct reading of the wellhead can be taken to within an accuracy of 0.2 degrees with the aid of known reading means, such as an underwater remote operated vehicle or underwater camera system, to determine the heading and amount of the angular misalignment.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
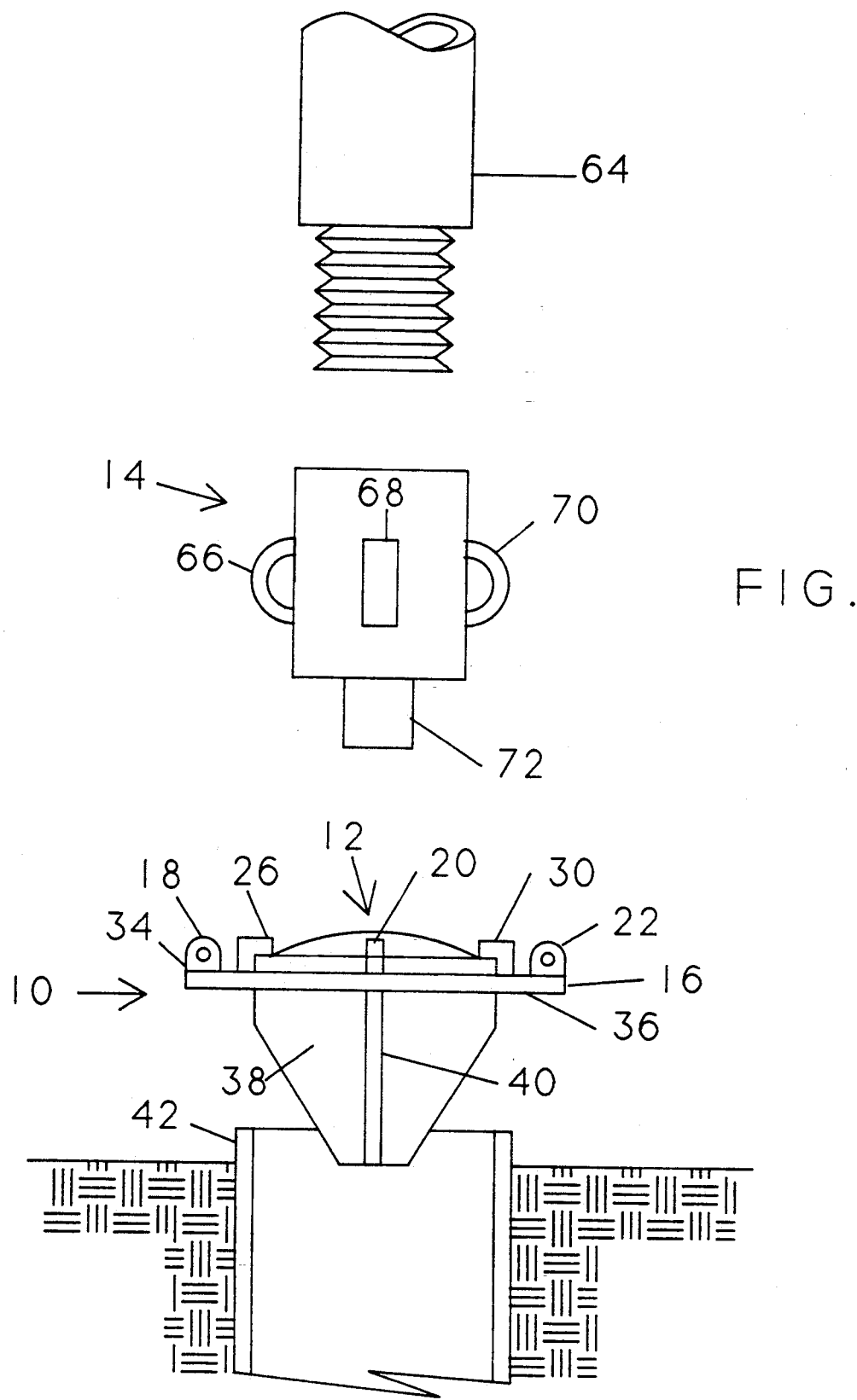
FIG. 1 is an exploded side elevation of the present invention showing how it is used.

The subject tool consists of three main components, the level centering insert 10, the level indicator 12 and the support sub 14.

The top of the level centering insert 10 is the level indicator support plate 16 made of a circular steel plate. On the top face of this support plate 16 are four welded insert lift eyes 18,20,22,24. These are four steel plate lips with a single hole bored in each lip for connecting the support cables (not shown) via shackles (also not shown). These lift eyes are positioned on the outer edge of the top surface 34 of the support plate 16 at 90 degree intervals. Also positioned on the support plate are four level indicator clamps 26,28,30,32. These clamps are positioned near the lift eyes and act to attach the level indicator 12 to the support plate 16. Depending from the bottom surface 36 of the support plate are a plurality of steel plate blades 38,40 forming a self-centering alignment means. The blades 38,40 are welded to the support plate 16 such that they form a cross with intersecting axes of 90 degrees. The blades 38,40 are also cut so that they provide a taper of decreasing diameter moving away from the support plate. The function of these blades 38,40 is to help in the stabbing of the insert into the wellhead 42. The actual dimensions of these blades will vary depending on corresponding inner diameter and the type of underwater wellhead to be measured. While a pair of plates have been shown, any arrangement of three or more blades all radiating from the common axis of the tool could likewise be used.

Figure 2:
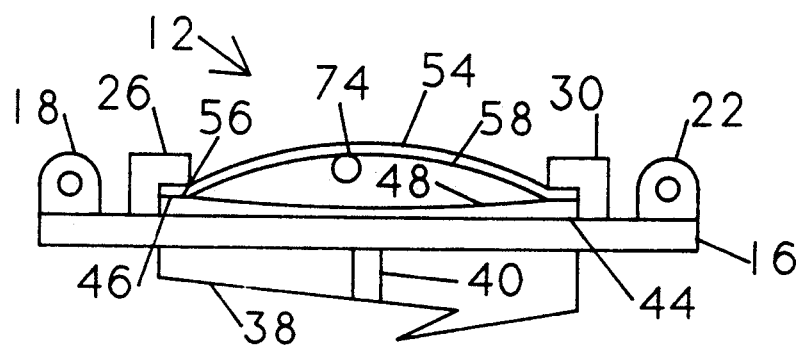
FIG. 2 is a detailed vertical section through the level portion of the invention.
Figure 3:
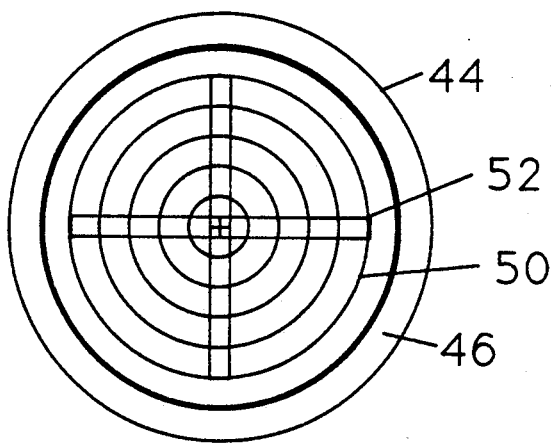
FIG. 3 is a plan view of the base of the level portion.
Figure 4:
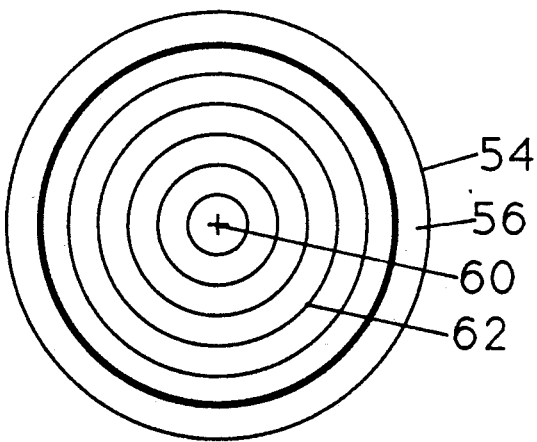
FIG. 4 is a plan view of the cover of the level portion.
Figure 5:
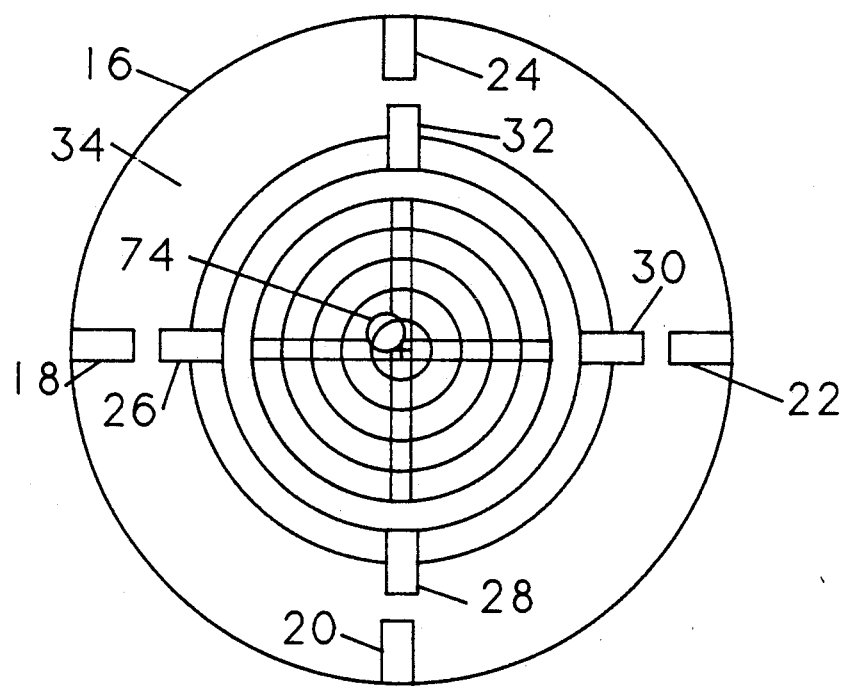
FIG. 5 is a plan view of the subject invention in use.

The level indicator 12, see FIGS. 2 to 5, has a base member 44, with an outer lip 46 and a central upwardly directed concave surface 48 having a patterned array of concentric index lines 50 and a cross-hair 52. Each of these lines preferably represents a 0.4 degree increment. A top cover 54, of transparent material such as clear polyurethane, has an outer lip 56 surrounding a central upward semispherical portion 58. A cross-hair 60 is drawn over the centerpoint of the target area inside the level indicator 12. This can also form the axis for concentric index rings 62.

The support sub 14 is attached to the bottom of the drillpipe 64. This sub 14 provides four equally spaced lugs 66,68,70 (only three of which are shown) for receiving the opposite end of the support cables (not shown) connected to the respective insert lift eyes 18,20,22,24. On the bottom of this support sub is a camera housing 72 which provides a means for attaching a downhole camera to the drillpipe.

To use the subject wellhead level insert, the level indicator 12 is attached to the indicator support plate 16 of the level centering insert 10 by the four level indicator clamps 26,28,30,32. A single support cable (not shown) is attached to each insert lift eye 18,20,22,24 with the other end of the cable connected to a respective lug on the support sub 14. A downhole camera 56 is then mounted in the camera housing on the bottom of the support sub 14. The drillpipe 64 is then attached to the top of the support sub 14 and the wellhead level insert 10 is run below the water until it is near the top of the wellhead 42. The assembly is then lowered onto the top of the wellhead whereby the camera is able to observe the inclination measurement as indicated by the bubble or ball 74. In order to assure that the reading is correct, the insert 10 can be picked-up off the top of the wellhead and slightly rotated. After lowering the insert back onto the top of the wellhead, a confirmation reading can be taken. Next a remote operated vehicle can be brought near the wellhead. By referencing a line of projection intersecting two other well slots, along with using the certified platform survey results, the heading of the angular offset can then be determined.

The present invention has been shown and described with a bubble indicator means. It should be readily appreciated by those skilled in the art that other similar level indicating means could be used. For example, a conductive ball could be positioned on the concave surface of a base member having a patterned array of conductors embedded therein. Movement of the ball could be detected from the conductors to give the angular offset of the wellhead.

The present invention may be subject to many modifications and changes which may occur to those skilled in the art without departing from the spirit or essential characteristics of the present invention as defined by the appended claims.

What is claimed is:

1. An apparatus for determining the level and orientation of an underwater wellhead comprising:
    plate means having top and bottom surfaces and a diameter substantially larger than that of said wellhead;
    centering means having a generally conical configuration and depending from said bottom surface, the larger end of said centering means being substantially smaller in diameter than said plate means to be loosely received in said wellhead;
    level indicator means;
    means to secure said level indicator means to said top surface;
    means to suspend said plate from a drillstring; and
    means to read the level indicator means whereby said apparatus can be lowered by a drillstring to engage a wellhead by gravity to monitor the level and orientation of said wellhead.

2. An apparatus according to claim 1 wherein said centering means comprises:
    a plurality of substantially triangular plate means extending substantially radially from a center point of said plate and forming an axis for said apparatus normal to said plate.

3. An apparatus according to claim 2 wherein outer edges of said plurality of substantially triangular plate means generally define a truncated conical configuration.

4. An apparatus according to claim 1 wherein said level indicator means is a bubble indicator.

5. An apparatus according to claim 1 wherein said level indicator comprises a base plate having a concave surface with concentric indicia thereon; and
    a cover member of transparent material bearing like indicia thereon.

6. An apparatus according to claim 5 wherein said cover member is convex defining a chamber between said cover member and said base plate.

7. An apparatus according to claim 6 wherein said chamber is substantially liquid filled save for an indicator bubble.

8. An apparatus according to claim 6 further comprising an indicator ball in said chamber.

9. An apparatus according to claim 1 wherein said means to secure said level indicator means comprise a plurality of clamps secured to said top surface of said plate in spaced relationship about said level indicator means.

10. An apparatus according to claim 1 wherein said means to suspend said plate comprise a plurality of eyelets secured to said top surface of said plate and receiving respective cable means therein whereby said apparatus can be suspended from a drillstring or the like.

11. An apparatus according to claim 1 wherein said means to read the level indicator means comprises: camera means.

12. A method for determining the level and orientation of an underwater wellhead comprising the steps of:
    providing an apparatus having a plate member with a diameter substantially greater than the wellhead diameter and well stabbing centering means of substantially less diameter than said wellhead depending from a bottom surface thereof and level indicator means secured to an upper surface thereof:
    placing said apparatus on the underwater wellhead to lie there against under the force of gravity; and
    reading the inclination as shown by said level indicator means.

13. A method according to claim 12 wherein said apparatus is raised, rotated and reset to perform a confirmation reading of level.

* * * * *